(12) United States Patent
Sedgwick (10) Patent No.: US 11,559,880 B1
(45) Date of Patent: Jan. 24, 2023

(54) ADJUSTMENT TOOL FOR GYMNASTICS UNEVEN BARS APPARATUS

(71) Applicant: David C Sedgwick, Butler, PA (US)

(72) Inventor: David C Sedgwick, Butler, PA (US)

(*) Notice: Subject to any disclaimer, the term of this patent is extended or adjusted under 35 U.S.C. 154(b) by 211 days.

(21) Appl. No.: 17/092,412

(22) Filed: Nov. 9, 2020

Related U.S. Application Data (60) Provisional application No. 62/939,237, filed on Nov. 22, 2019.

(51) Int. Cl.
| | | |
|---|---|---|
| *B25J 1/04* | (2006.01) | |
| *B25J 1/00* | (2006.01) | |
| *A47F 13/06* | (2006.01) | |
| *A63B 3/00* | (2006.01) | |
| *A63B 1/00* | (2006.01) | |

(52) U.S. Cl.
CPC ................ *B25J 1/00* (2013.01); *A47F 13/06* (2013.01); *B25J 1/04* (2013.01); *A63B 1/00* (2013.01); *A63B 3/00* (2013.01); *A63B 2225/093* (2013.01)

(58) Field of Classification Search
CPC ..... B25J 1/00; B25J 1/04; A47F 13/06; A47F 5/0892; A63B 1/00; A63B 3/00; A63B 2225/093
USPC .......................................... 294/175, 209–211
See application file for complete search history.

(56) References Cited

U.S. PATENT DOCUMENTS

| | | | | | |
|---|---|---|---|---|---|
| 2,385,820 | A | * | 10/1945 | Leibow .................... | H01J 9/006 81/53.11 |
| 2,640,236 | A | * | 6/1953 | Hume ...................... | D06F 53/04 174/175 |
| 3,929,365 | A | * | 12/1975 | Hunt ........................ | H01J 9/006 81/53.12 |
| 4,089,553 | A | * | 5/1978 | Frykholm .................. | B25J 1/04 482/17 |
| 4,470,595 | A | * | 9/1984 | Johnston .................... | B25J 1/04 482/16 |
| 4,647,094 | A | * | 3/1987 | Bergkvist ................... | B25J 1/04 294/111 |
| 4,687,194 | A | * | 8/1987 | Good ........................ | A63B 3/00 482/901 |
| 4,793,646 | A | * | 12/1988 | Michaud, Jr. ........... | B63B 21/54 114/221 R |
| 5,379,666 | A | * | 1/1995 | Held ........................ | H01J 9/006 81/53.11 |
| 5,496,083 | A | * | 3/1996 | Shouse, Jr. ............... | B25B 9/00 81/487 |
| 7,066,511 | B2 | * | 6/2006 | Newman .................. | H01K 3/32 81/53.11 |
| 10,149,522 | B1 | * | 12/2018 | Persley .................... | A47F 13/06 |

(Continued)

*Primary Examiner* — Dean J Kramer
(74) *Attorney, Agent, or Firm* — Karen Tang-Wai Sutton (57) ABSTRACT

An adjustment tool for adjusting a height of an upper bar of a gymnastics uneven bars apparatus. The adjustment tool is comprised of a shaft having a handle at one end and a horizontally-facing hook at an opposed end. In another embodiment, the hook faces upwards. The hook is sized and shaped to receive the upper bar, and is formed with a pair of outwardly flaring lips to allow the hook to be guided onto the bar without causing damage thereto. The handle is typically formed into a hook resembling that of a cane. A shaft length in an adjustable embodiment is comprised of two or more telescoping members mating with one another to establish and maintain desired shaft length.

2 Claims, 13 Drawing Sheets

(56) References Cited

U.S. PATENT DOCUMENTS

2005/0275229 A1\* 12/2005 Cvijic .................. A61J 9/0623
                                                                         294/210

\* cited by examiner

ADJUSTMENT TOOL FOR GYMNASTICS UNEVEN BARS APPARATUS

CROSS REFERENCE TO RELATED APPLICATIONS

Reference is made to and priority claimed from U.S. application Ser. No. 62/939,237 for an Adjustment Tool for Gymnastic Uneven Bars Apparatus, filed on 22 Nov. 2019, whose disclosure is herein incorporated in its entirety by reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

(1) Field of the Invention

The present invention pertains to the field of gymnastics equipment, and specifically to tools used with uneven bar equipment to adjust an upper bar height.

(2) Background Art

Uneven bars, also known as asymmetric bars, are standard equipment in women's gymnastics and feature a pair of parallel bars having different vertical height and width positions relative one another. The vertical position of the bars is determined by the height of the gymnast, and taller gymnasts require the upper bar vertical height measured from the floor to the bar to be greater relative to the needs of a shorter gymnast. Currently, the upper bar 32 is repositioned by a coach or other person climbing onto the equipment and manually raising each end of the bar to the desired position. Two people perform this action most efficiently, although it can be done by a single person.

During gymnastics competitions, a gymnast has a specific amount of time in which to perform her gymnastics warm up skills before performing her competitive routine on the bars before the competition judges, and time required to position the upper bar is included in the time allocated to the warm up. Thus, coaches often adjust the uneven bar apparatus 30 so that gymnasts of similar heights perform their routines sequentially to reduce the number of times the upper bar must be repositioned and to reserve as much time as possible to perform the warm ups. The current lack of an efficient way for a single person to adjust the upper bar position thus requires gymnasts to rush their warm up routines, coaches to scramble to try to adjust the upper bar, and often in the rush to adjust the upper bar, components of the uneven bars apparatus 30 are abused and thus capable of failure during use.

What is needed is an adjustment tool for the uneven bars apparatus that allows a single person to adjust the upper bar quickly, efficiently and safely, without requiring the person to climb on the equipment or stand on chairs, mats or ladders.

DISCLOSURE OF INVENTION

An adjustment tool for positioning an upper bar of a gymnastics uneven bars apparatus, the tool having a shaft with a handle end, an opposed hook end, and an axial shaft length between the handle end and the opposed hook end. A handle is affixed at the handle end, and a hook at the opposed hook end. The hook is comprised of a hook body with a bend in a middle of the hook body, the bend of the hook dividing the hook body into a first member and a second member. The hook body is joined to the shaft by a hook neck. The hook body defining a bar-receiving opening, the hook body terminating in a pair of opposed lips flaring outwardly away from the bar-receiving opening. The hook body is positioned at the opposed hook end such that the bar-receiving opening is oriented in relation to the shaft so as to be at least one of perpendicular to and parallel to the axial shaft length.

In a first embodiment, the hook is removably affixed to the shaft by a plurality of mating threads formed on the hook neck and the hook end of the shaft. In a second embodiment, the hook body and neck are a single piece, with the hook neck either removably affixed to the shaft by way of pressure fitting or mating threads.

The shaft is comprised of at least two telescoping members to allow a length of the shaft to be adjusted as needed. Adjustment and maintenance of the shaft length is by way of a spring loaded button fitting into a series of apertures, or by using a threaded coupling that uses a pressure fitting to maintain shaft length.

The adjustment tool is typically made of structural plastic or metal.

A method of using the adjustment tool to adjust a height of the upper bar of the gymnastics uneven bar apparatus includes the steps of loosening all cable tension adjustors on the uneven bars gymnastics apparatus, loosening T-handle screw locks on both upright support bars, positioning the hook of the adjustment tool around a circumference of the upper bar, pulling the spring loaded lock pin to free the adjustable upright support bar, repositioning the upper bar using the adjustment tool to the desired height, releasing the spring loaded lock pin to secure the upper bar height, removing the hook of the adjustment tool from the upper bar, tightening the T-handle screw locks on both upright support bars and tightening the cable tension adjusters. After the step of removing the hook of the adjustment bar and prior to the step of tightening the T-handle screws, the method further comprises the step of storing the adjustment tool by hooking the handle over a portion of the gymnastics uneven bars apparatus.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components. 10 upper shaft 12 hook 12a lip 12b hook body member 12c neck 12d bar-receiving opening 12e hook bend 14 threaded coupling 14a end cap 14b compression fitting 16 handle 18 lower shaft 20 spring button 22 aperture 24 spring loaded button 30 uneven bars equipment or uneven bars apparatus 32 high bar rail or upper bar of uneven bars apparatus 34 cable tension adjuster 36 T handle screw 38 spring loaded lock pin 40 user 100 adjustment tool

DETAILED DESCRIPTION

Figure 3:
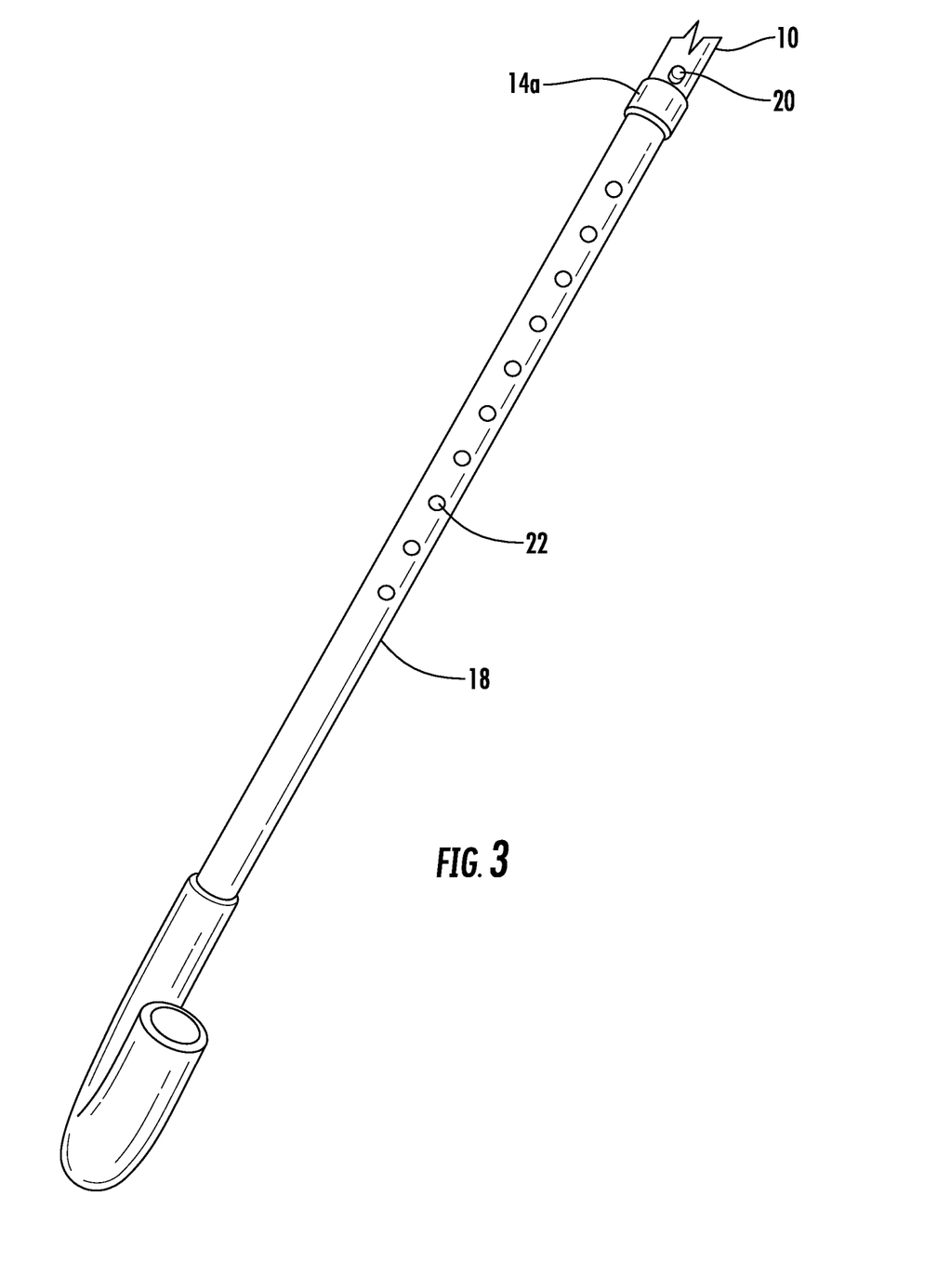
FIG. 3 is a close up view of the lower shaft shown in FIG. 1.
Figure 4A:
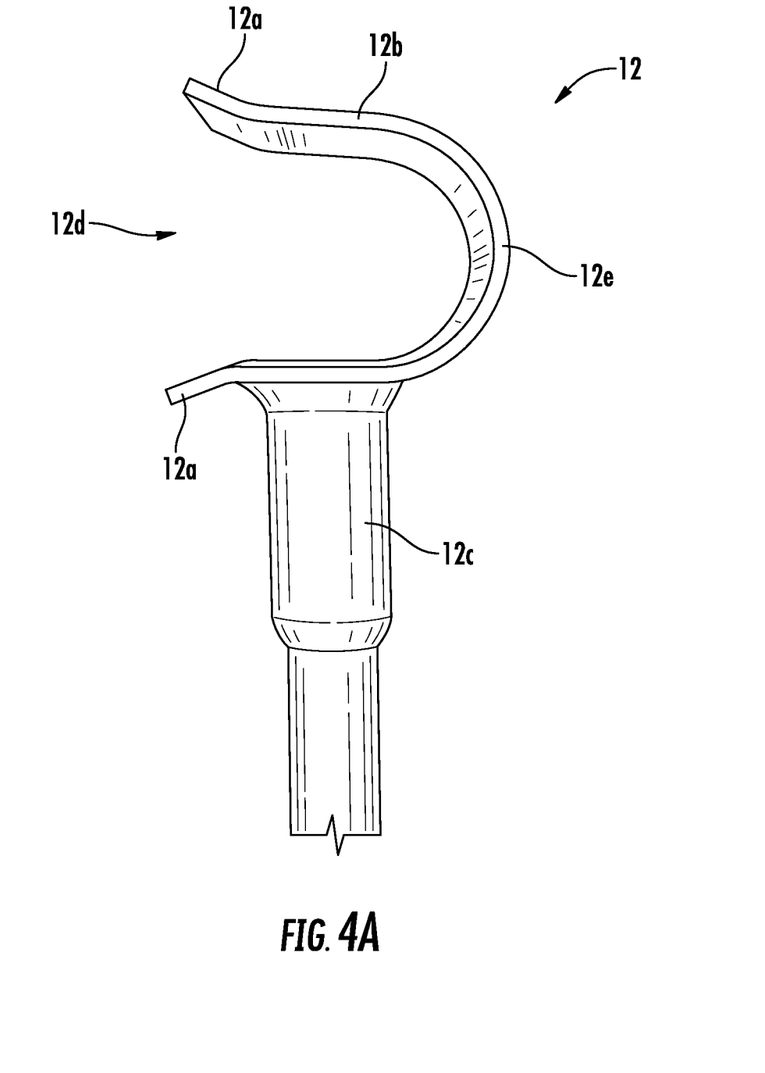
FIGS. 4A and 4B are close up views of a hook of the adjustment tool showing two hook opening orientations.
Figure 4B:
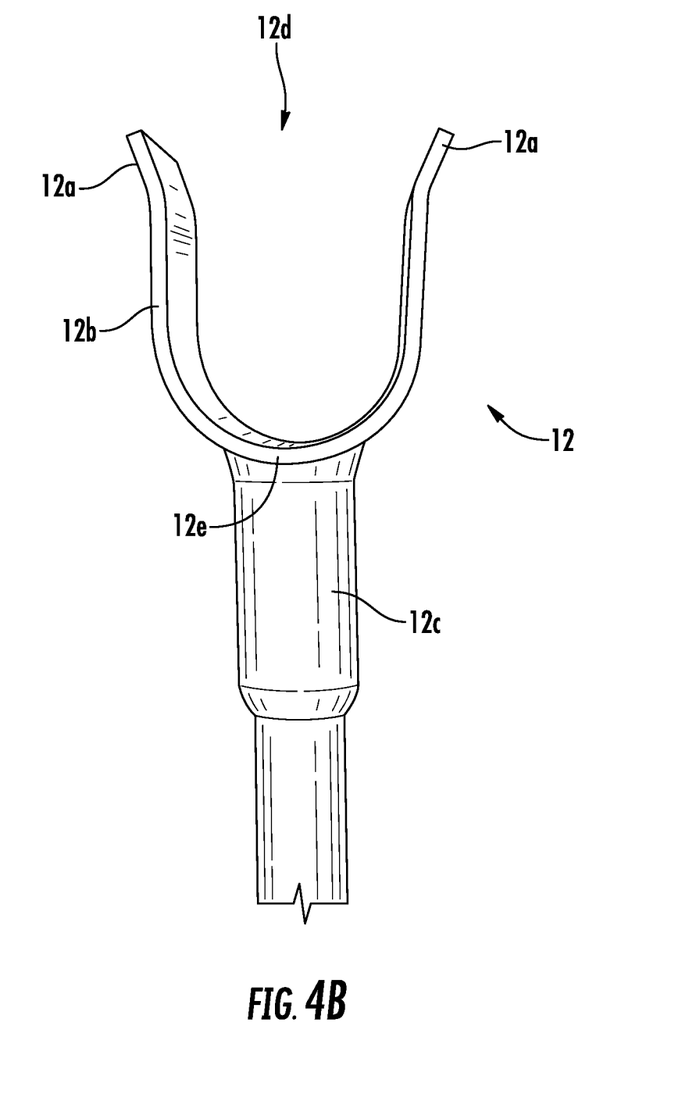
Figure 5:
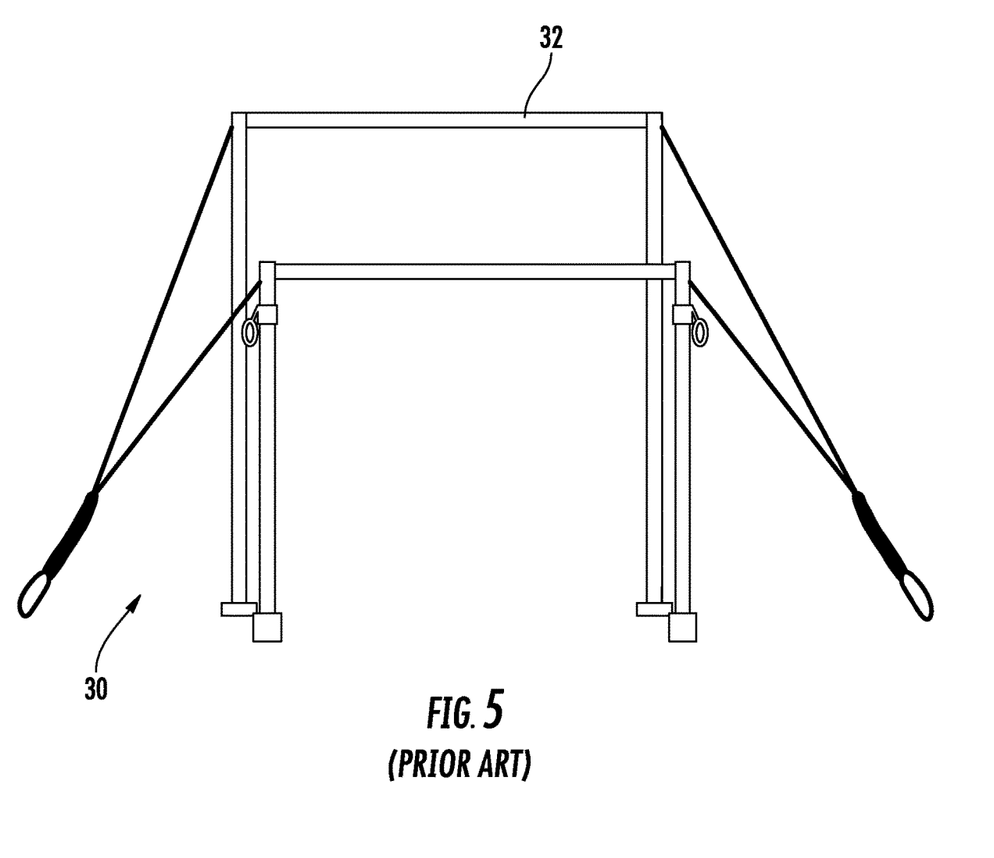
FIG. 5 is a representative gymnastics uneven bars apparatus known in the prior art.

An adjustment tool according to the invention 100 is shown in FIGS. 1-4B and is for adjusting an upper bar 32 of a gymnastics uneven bars apparatus 30 shown in FIG. 5. A method of using the adjustment tool 100 is shown in FIGS. 6A-G.

Figure 1:
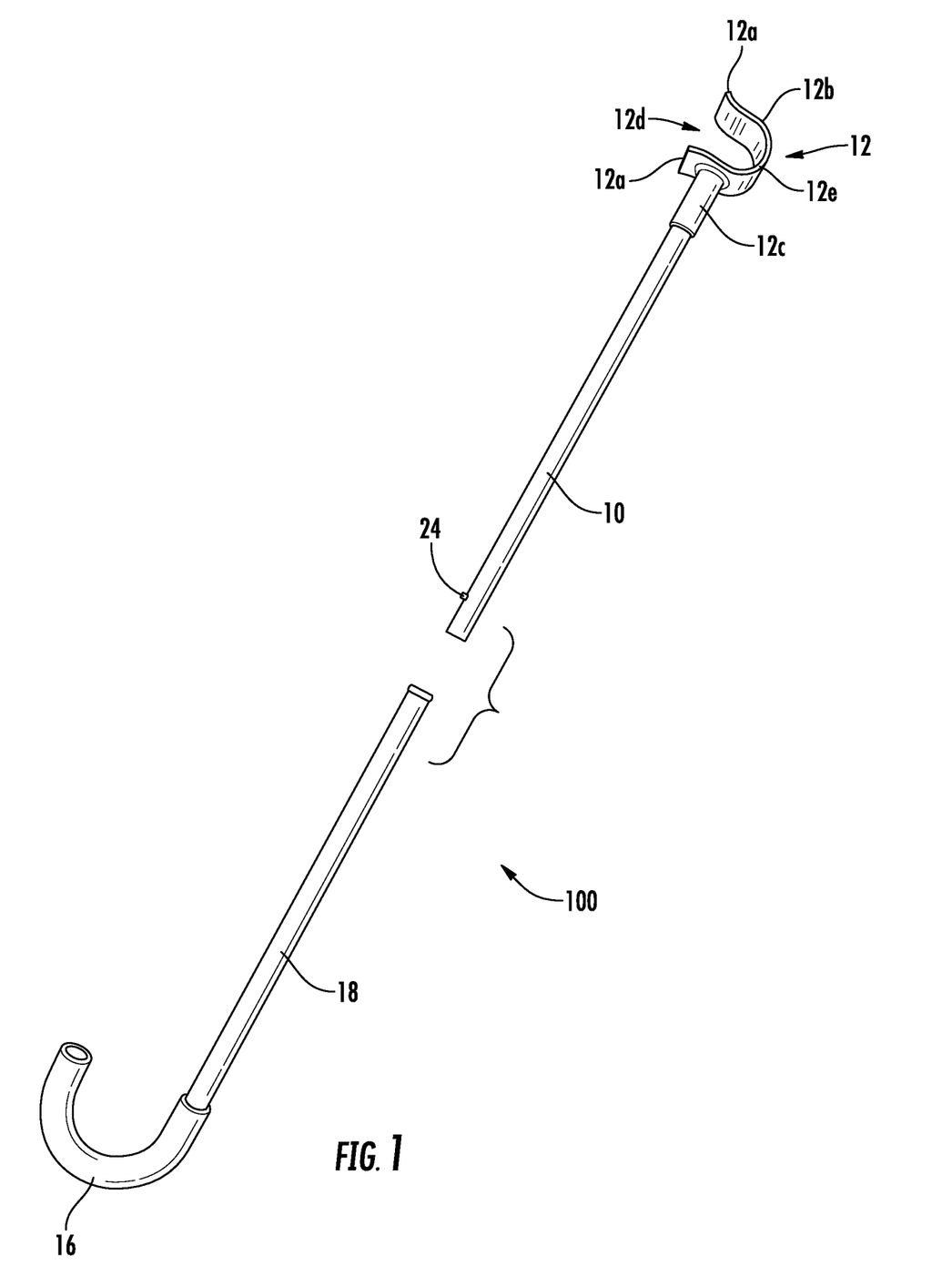
FIG. 1 is a perspective view of an adjustment tool for a gymnastics uneven bars apparatus.
Figure 2:
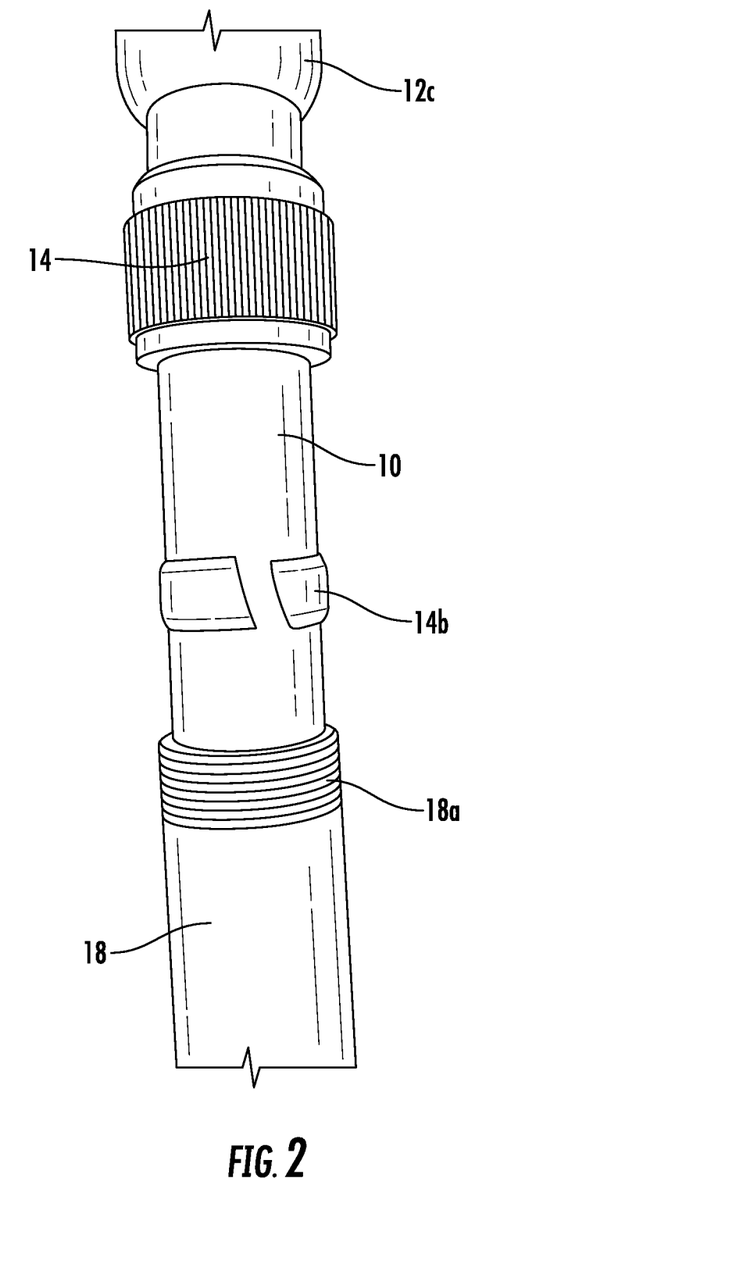
FIG. 2 is a close up view of an upper shaft threadably affixed to a lower shaft.

The adjustment tool 100 shown in FIG. 1 is comprised of shaft having a hooked handle 16 at a handle end, and a hook 12 at its opposed hook end. In an adjustable shaft embodiment shown in the Figures, an upper shaft 10 adjustably telescopes into a lower shaft 18 until a desired total length of the adjustment tool 100 is achieved. An axial length of a typical adjustable shaft measured from the handle end to the opposed hook end ranges from about 15 inches to 35 inches. A desired position of the upper shaft 10 is maintained in FIG. 1 using a spring loaded button 24 affixed to the upper shaft inserted into one of a series of apertures 22 formed into the lower shaft 18, as shown in more detail in FIG. 3, or alternatively, as shown in FIG. 2 by using a compression fitting 14b inserted onto the upper shaft 10 with a coupling 14 threaded onto a threaded uppermost end 18a of the lower shaft 18, such that tightening the coupling 14 constricts the compression fitting 14b and maintains the desired position of the upper shaft 10 relative to the lower shaft 18. FIG. 3 shows an additional end cap 14a screwed onto the uppermost threaded end of the lower shaft 18 and its inclusion here is decorative so as to neatly finish the uppermost end of the lower shaft 18 and can be omitted if desired. The adjustment tool 100 can also be offered with both the compression and button structures for position maintenance, although the inventor stresses that either can work separately to maintain the desired position of the upper shaft 10 and hence includes these embodiments as examples of suitable ways to adjust shaft length and are not meant to limit the adjustment mechanism to just what is shown in the Figures.

FIG. 4A is a close-up view of the hook 12 of the adjustment tool 100. The hook 12 is comprised of a u-shaped body 12b with a bend 12e in a middle portion of the body 12b, and a bar-receiving opening 12d oriented so as to face horizontally relative to the upper and lower shafts. The hook body 12b in FIG. 4A is attached to the upper shaft 10 via a hook neck 12c, which is itself affixed to one side of the hook body 12b. The inventor notes that the bar-receiving opening 12d can also be oriented so as to face upwards, as shown in FIG. 4B, where the hook neck 12c is affixed to the bend 12e of the hook 12. Regardless of orientation, the bar-receiving opening 12d is sized and shaped to complement a shape of the upper bar 32 of the gymnastics uneven bars apparatus 30. The hook body 12b terminates into a pair of lips 12a flaring outwards, such that when the upper bar 32 is positioned inside the bar-receiving opening 12d, the lips 12a flare away from the upper bar 32 and away from the bar-receiving opening. The shape of the lips 12a allows for efficient coupling of the hook 12 onto the upper bar 32 as well as prevention of damage to the upper bar 32 by inaccurate or inartful positioning of the hook 12 during a competition when adjustment of the upper bar 32 is performed under time constraints. The neck 12c of the hook 12 in the Figures is shown as being integral with the hook stamped or molded as a single piece, or alternatively fixedly attached to the upper shaft 10, however the inventor notes that the hook and neck can in fact removably affixed, where the neck 12c is pressure fitted, threadably coupled, or otherwise suitably removably coupled to the uppermost end of the upper shaft 10. All components of the hook 12 can be made of plastic, ABS, or metal so long as the material is durable and rigid.

FIG. 5 shows the gymnastics uneven bars apparatus. Measurement of the bars provided by the Federation Internationale de Gymnastique (FIG) in the Apparatus Norms brochure are as follows: High bar height: 250 centimeters (8.2 ft) Low bar height: 170 centimeters (5.6 ft) Diameter of bar: 4 centimeters (1.6 in) Length of the bars: 240 centimeters (7.9 ft) Diagonal distance between the two bars: varies, 130 centimeters (4.3 ft)-190 centimeters (6.2 ft) (adjustable)

The height of the upper or high bar at 8 foot 2 inches is typically outside of arm's reach of an average height person, and as height adjustment is made on each end of the bar, a fastest bar adjustment requires a minimum of two people standing on something, or climbing up the sides of the apparatus in order to adjust the bar height.

Figure 6A:
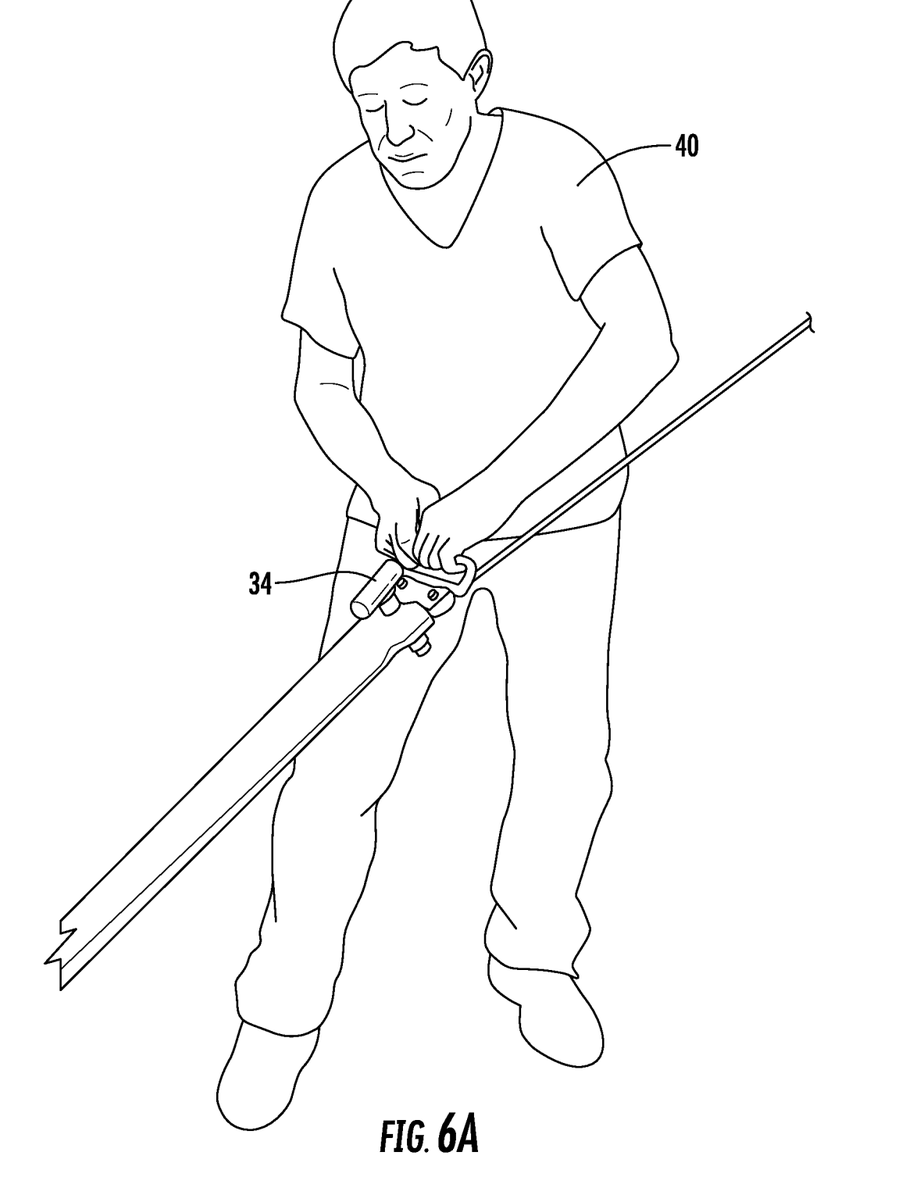
FIGS. 6A-G show a step by step method of using the adjustment tool in FIGS. 1-4B to adjust a vertical height of an upper bar of the representative gymnastics uneven bars apparatus shown in FIG. 5.

FIGS. 6A-G illustrate a step by step method of a user 40 using the adjustment tool 100 to adjust a vertical height of the upper bar 32:

Step 1: Loosen all four cable tension adjusters 34 on the uneven bar apparatus as shown in FIG. 6A.

Figure 6B:
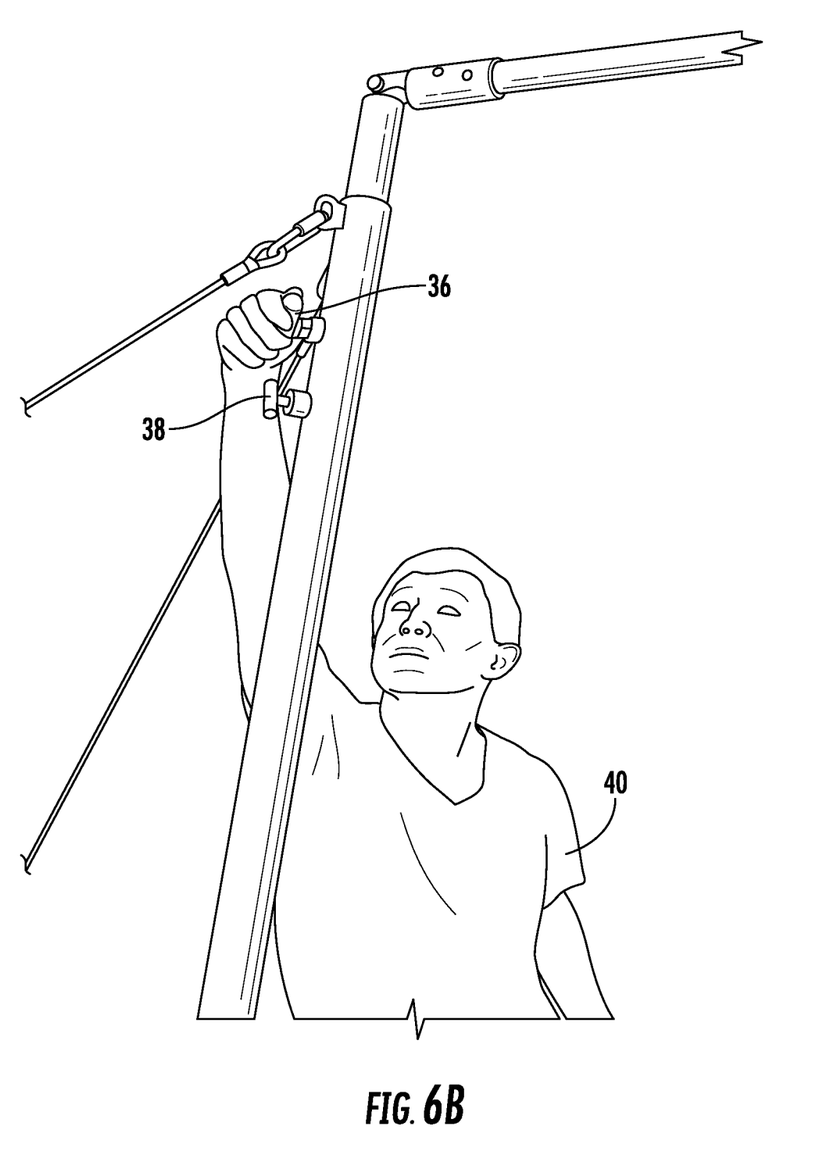

Step 2: Loosen "T" handle screw locks 36 on both of the upright support bars as shown in FIG. 6B.

Figure 6C:
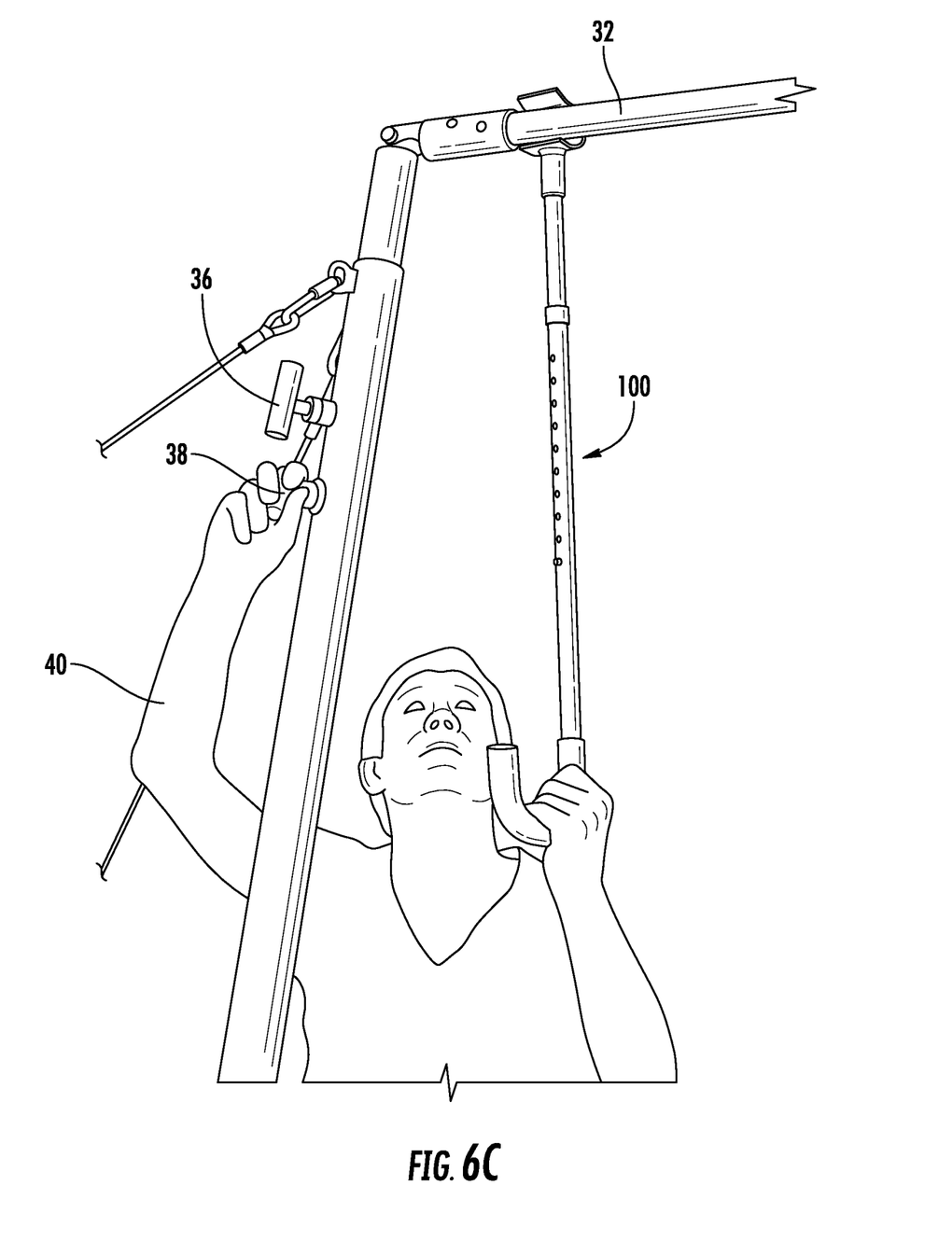

Step 3: Attach adjustment tool 100 to the upper bar 32 by positioning the hook 12 around the upper bar, and pull the spring loaded lock pin 38 to free the adjustable upright support bar as shown in FIG. 6C.

Figure 6D:
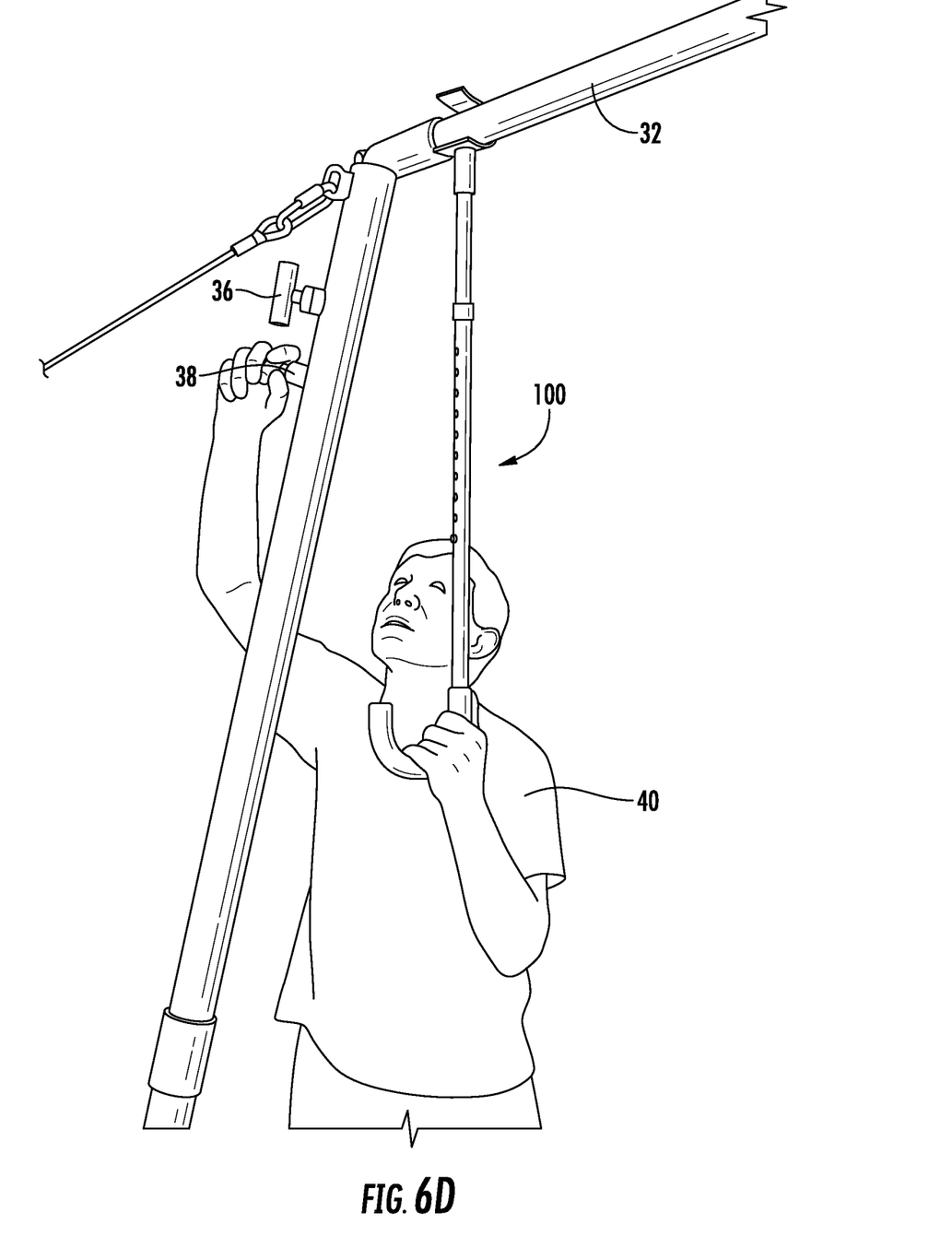

Step 4: Raise or lower the upper bar 32 with the adjustment tool 100 and release the spring loaded lock pin 38 to retain the upper bar 32 height as shown in FIG. 6D. If necessary, adjust a length of the shaft by changing the positional telescoping relationship of the upper and lower shafts, and then securing the position by way of the coupling 14 or the button 24 in conjunction with the apertures 22.

Figure 6E:
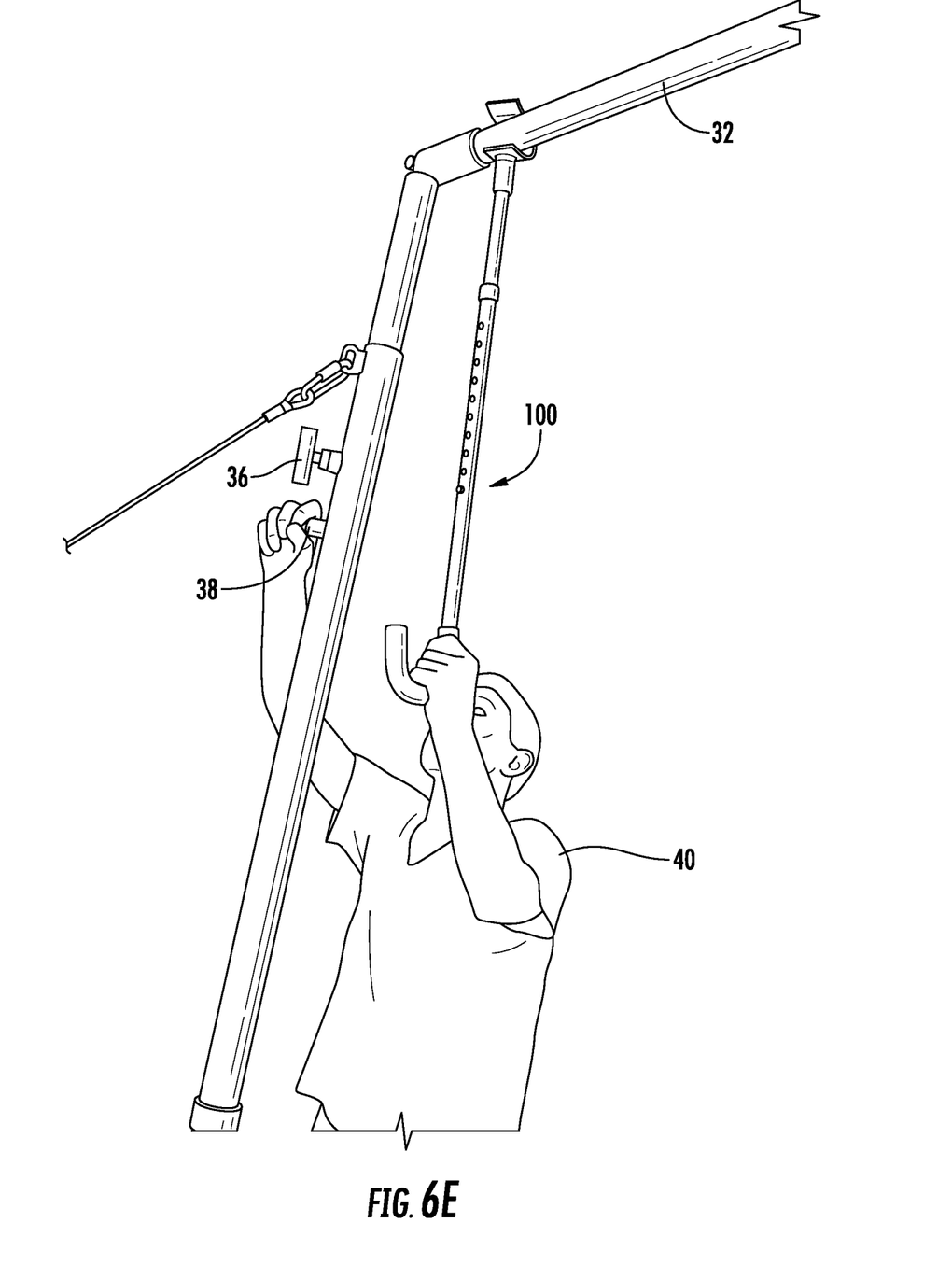

Step 5: Tighten the "T" handle screw locks 36 to secure the adjustment and repeat the process on the other side of the apparatus as shown in FIG. 6E.

Figure 6F:
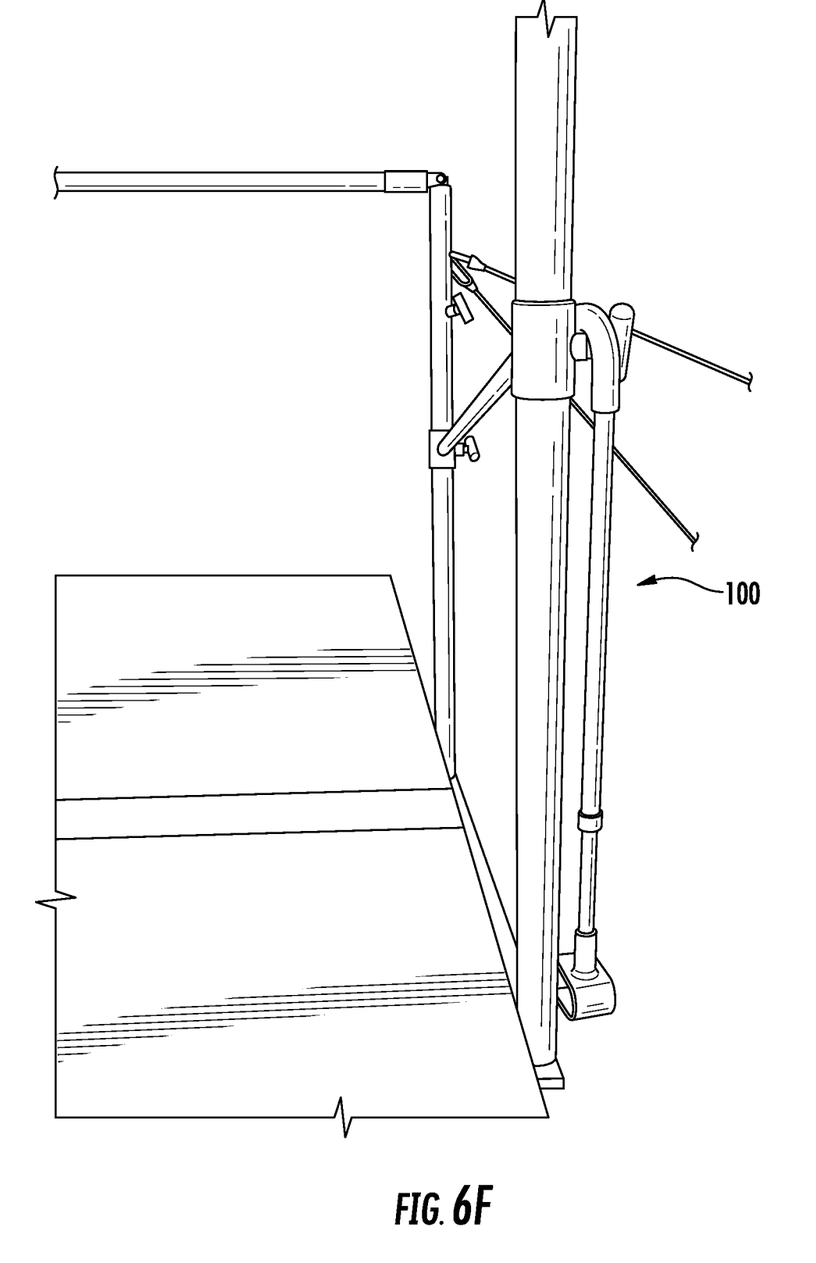
Figure 6G:
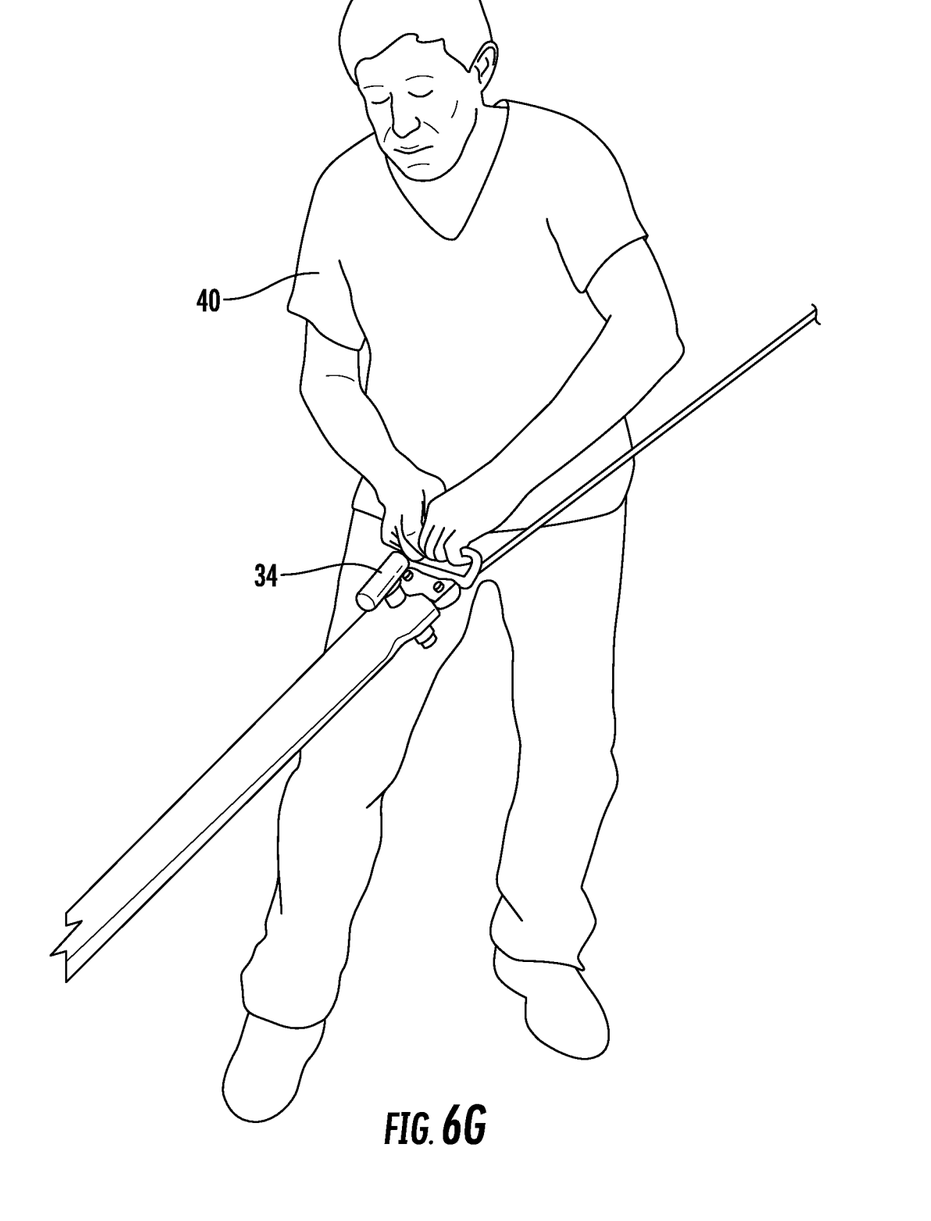

Last Step 6: Retighten all four cable tension adjusters 34 as shown in FIG. 6G.

Optional Step A: Store the adjustment tool on the apparatus or nearby until another adjustment is needed as shown in FIG. 6F, either after Step 4 or Step 5.

Optional Step A is included as a typical way the adjustment tool 100 would be conveniently and safely stored while adjusting the uneven bar equipment, but this step is not necessary for the adjustment of the upper bar height.

The inventor is a seasoned gymnastics coach and estimates the adjustment tool 100 saves an average of ten seconds per bar setting change. In an example of five athletes needing a bar setting change, using the method described in FIGS. 6A-G will save about fifty seconds. In a non-competitive situation, the actual time saved is not of primary importance. It is the ease, convenience and the reduction of wear and tear on the uneven apparatus that makes the adjustment tool valuable. Saving time while adjusting the bar is critical in competitive situations. Using an example of five level ten athletes on an uneven bar rotation in a competition, each athlete is allowed two minutes each to warm up prior to performing before the judges. This translates into a warm up period of ten minutes for that squad. The athletes' warm-up period is further timed by a competition official, and no extra time is allocated to accommodate any athlete's bar setting change. If a bar setting change takes twenty seconds and there are five athletes who need a setting change, the time saved by using the adjustment tool 100 is fifty seconds, providing each athlete one or two more warm-up turns before the timed warm-up ends. This extra time is critical in a high level competition. Also, because in the prior art there currently exists no efficient way to adjust the height of the upper bar, coaches will pull the spring loaded lock pin 38 and release it immediately without supporting the upper bar 32. The bar has significant weight and drops with great force onto the internal end of the spring loaded lock pin 38 and eventually can shear the end off of the lock pin which prevents the upper bar to securely lock, creating a situation where an equipment failure is possible during competition or training that may result in great injury to the athlete. The inventor has spoken to competition equipment set-up contractors and manufacturers who complain they are frequently replacing the spring loaded lock pins 38 in their uneven bars equipment 30. The hook 12 of the adjustment tool 100 allows the user to securely control motion of the upper bar 32, whether the bar 32 is being adjusted upwards or downwards, and yet allow the hook 12 to be quickly positioned around or removed from the upper bar 32.

It is to be understood that the above-described arrangements are only illustrative of the application of the principles of the present invention. Numerous modifications and alternative arrangements may be devised by those skilled in the art without departing from the scope of the present invention. For instance, the handle is shown as a hook for convenience storage on the apparatus itself, but the handle could also be configured in other useful or ergonomic shapes, including shovel-handle grips, and the like. The shaft of the adjustment tool could also be configured as two or more pressure fitted tubes attached by an internal string, allowing the apparatus to be taken apart or put together quickly, then broken down and stored more efficiently. As mentioned before, the two hook orientations shown in FIGS. 4A and 4B show two useful embodiments, however the inventor notes that the upwards hook configuration in FIG. 4B provides less overall control over the upper bar movement, particularly when lowering the bar, and is thus while still technically useable, the inventor believes this hook arrangement is less safe and may subject the equipment to more wear and tear. He believes the orientation shown in FIG. 4A provides better control and thus extends the life of the adjustment components of the gymnastics uneven bars apparatus.

I claim:

1. A method of using an adjustment tool to adjust a height of an upper bar of a gymnastics uneven bars apparatus, the adjustment tool comprising:
    a shaft having a handle end, an opposed hook end, and an axial shaft length between the handle end and the opposed hook end;
    a handle at the handle end of the shaft; and
    a hook at the opposed hook end;
    wherein the hook is further comprised of a hook body and a bend in the hook body defining a bar-receiving opening, the hook body terminating in a pair of opposed lips flaring outwardly away from the bar-receiving opening; and
    wherein the bar-receiving opening is unobstructed by the pair of opposed lips; and
    wherein the hook body is positioned at the opposed hook end such that the bar-receiving opening is oriented in relation to the shaft so as to be at least one of perpendicular to and parallel to the axial shaft length; and
    the method comprising the steps of:
    loosening all cable tension adjustors on the uneven bars gymnastics apparatus;
    loosening T-handle screw locks on both upright support bars;
    positioning the hook of the adjustment tool around a circumference of the upper bar;
    pulling a spring loaded lock pin to free the adjustable upright support bar;
    repositioning the upper bar using the adjustment tool to the desired height;
    releasing the spring loaded lock pin to secure the upper bar height;
    removing the hook of the adjustment tool from the upper bar;
    tightening the T-handle screw locks on both upright support bars; and
    tightening the cable tension adjusters.

2. The method in claim 1, after the step of removing the hook of the adjustment tool and prior to the step of tightening the T-handle screws, further comprises the step of storing the adjustment tool by hooking the handle over a portion of the gymnastics uneven bars apparatus.

* * * * *